United States Patent [19]

Lear

[11] Patent Number: 5,355,147
[45] Date of Patent: Oct. 11, 1994

[54] ERGONOMIC COMPUTER MOUSE

[76] Inventor: Donald Lear, 11 Pine Side Dr., Perkasie, Pa. 18944

[21] Appl. No.: 130,692

[22] Filed: Oct. 4, 1993

[51] Int. Cl.$^5$ .............................................. G09G 3/02
[52] U.S. Cl. ................................. 345/156; 345/163; 345/164; D14/114
[58] Field of Search ...................... 345/156, 163–166; 248/118.1; D14/100, 107, 114

[56] References Cited

U.S. PATENT DOCUMENTS

| | | | |
|---|---|---|---|
| 5,095,303 | 3/1992 | Clark et al. | 345/165 |
| 5,165,630 | 11/1992 | Connor | 248/118.1 |
| 5,175,534 | 12/1992 | Thatcher | 345/156 |
| 5,203,845 | 4/1993 | Moore | 345/166 |

*Primary Examiner*—Ulysses Weldon
*Attorney, Agent, or Firm*—E. Michael Combs

[57] ABSTRACT

A container is arranged for ease of grasping in an ergonomically enhanced manner to minimize fatigue, to include an elliptical housing having an elliptical central opening, with the housing having an arcuate exterior surface, with a housing peripheral plane having a major and minor axis of said elliptical opening contained therewithin, with a wrist support leg projecting beyond the housing and a bottom wall of the housing to provide for a wrist support concave surface. The wrist support leg projects laterally to opposed sides of said peripheral plane.

5 Claims, 4 Drawing Sheets

ERGONOMIC COMPUTER MOUSE

BACKGROUND OF THE INVENTION

1. Field of the Invention

The field of invention relates to computer controller apparatus, and more particularly pertains to a new and improved ergonomic computer mouse wherein the same is arranged for ease of manual grasping minimizing fatigue during use.

2. Description of the Prior Art

Computer mouse structure of various types are employed in the prior art such as indicated in U.S. Pat. No. 4,862,165, wherein the ergonomic mouse structure provides for continuous grasping within a palm of an individual's hand.

The instant invention attempts to overcome deficiencies of the prior art by providing for a wrist support in association with the individual's palm being vertically oriented relative to an underlying support surface and in this respect, the present invention substantially fulfills a need in the prior art for convenience of use of such mouse structure.

U.S. Pat. No. 5,006,836 to Cooper sets forth a computer control device indicating control structure, wherein such disclosure is incorporated herein by reference relative to an example of a computer control mouse organization.

SUMMARY OF THE INVENTION

In view of the foregoing disadvantages inherent in the known types of computer mouse apparatus now present in the prior art, the present invention provides an ergonomic computer mouse wherein the same provides for an elliptical house having an elliptical central opening orthogonally oriented relative to a bottom wall of the housing structure. As such, the general purpose of the present invention, which will be described subsequently in greater detail, is to provide a new and improved ergonomic computer mouse which has all the advantages of the prior art computer mouse apparatus and none of the disadvantages.

To attain this, the present invention provides a container arranged for ease of grasping in an ergonomically enhanced manner to minimize fatigue, to include an elliptical housing having an elliptical central opening, with the housing having an arcuate exterior surface, with a housing peripheral plane having a major and minor axis of said elliptical opening contained therewithin, with a wrist support leg projecting beyond the housing and a bottom wall of the housing to provide for a wrist support concave surface. The wrist support leg projects laterally to opposed sides of said peripheral plane.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ergonomic computer mouse which has all the advantages of the prior art computer control apparatus and none of the disadvantages.

It is another object of the present invention to provide a new and improved ergonomic computer mouse which may be easily and efficiently manufactured and marketed.

It is a further object of the present invention to provide a new and improved ergonomic computer mouse which is of a durable and reliable construction.

An even further object of the present invention is to provide a new and improved ergonomic computer mouse which is susceptible of a low cost of manufacture with regard to both materials and labor, and which accordingly is then susceptible of low prices of sale to the consuming public, thereby making such ergonomic computer mouse economically available to the buying public.

Still yet another object of the present invention is to provide a new and improved ergonomic computer mouse which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
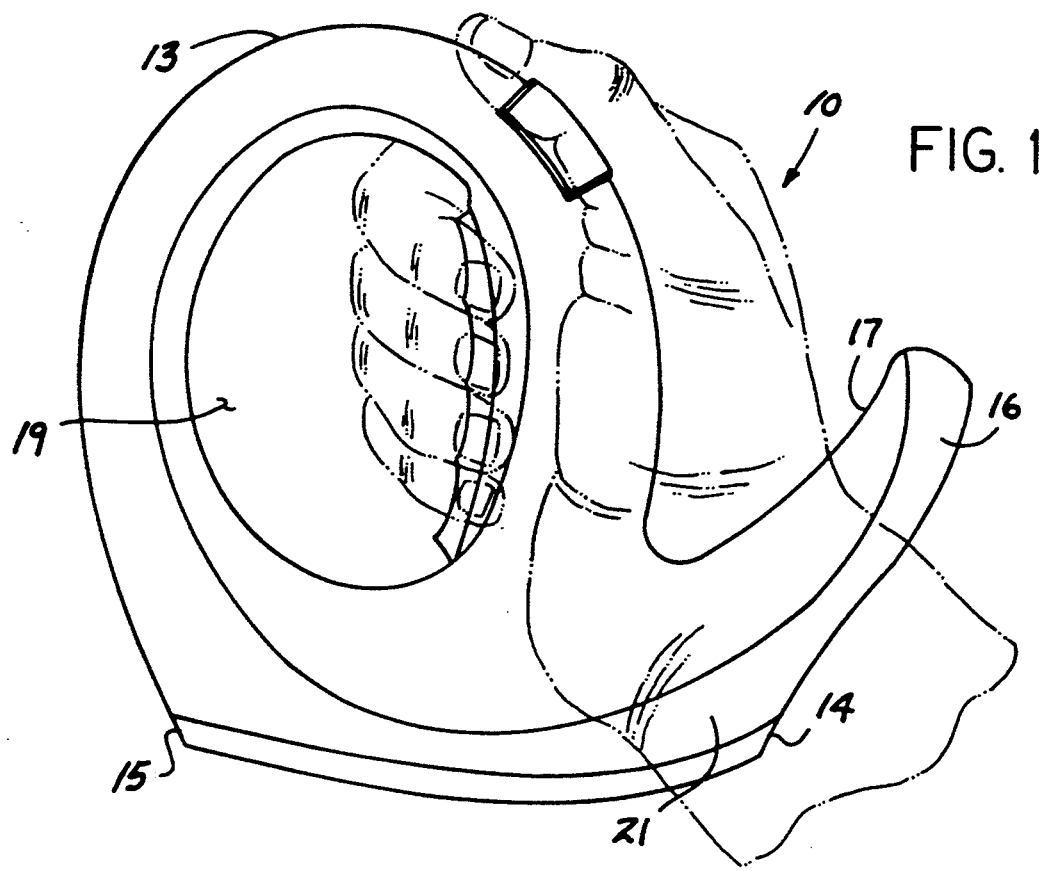
FIG. 1 is an isometric illustration of the invention.
Figure 2:
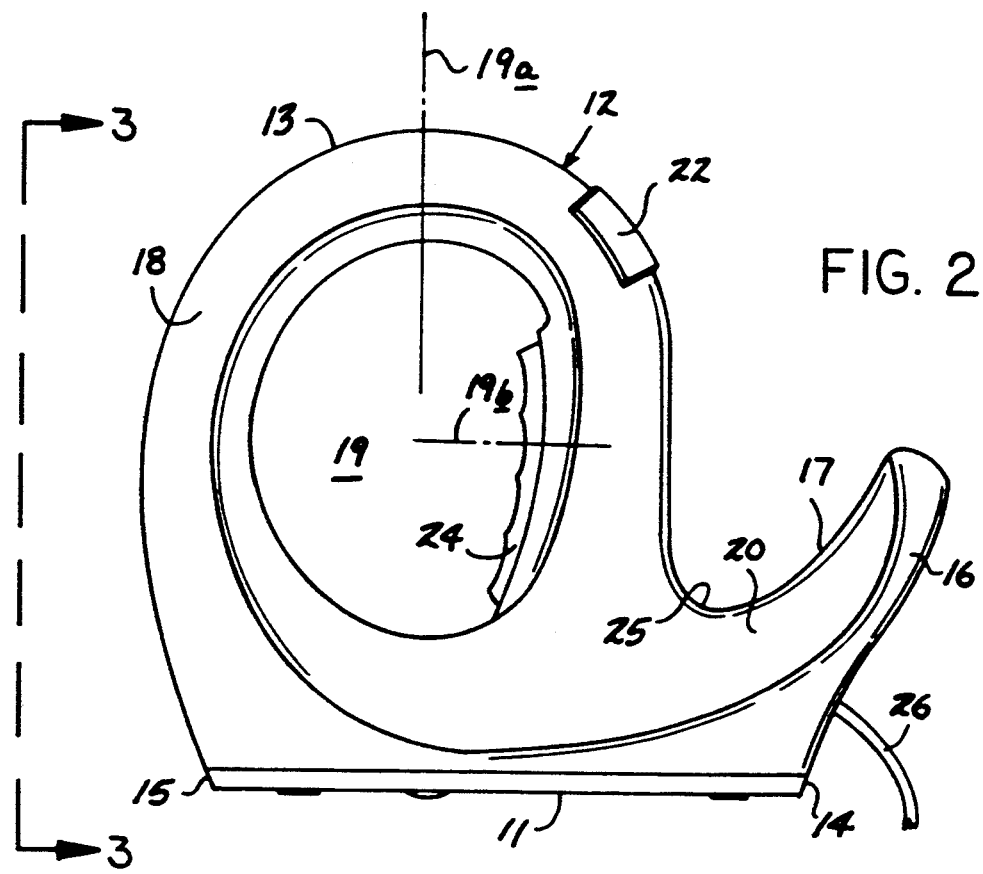
FIG. 2 is an orthographic side view of the invention.
Figure 3:
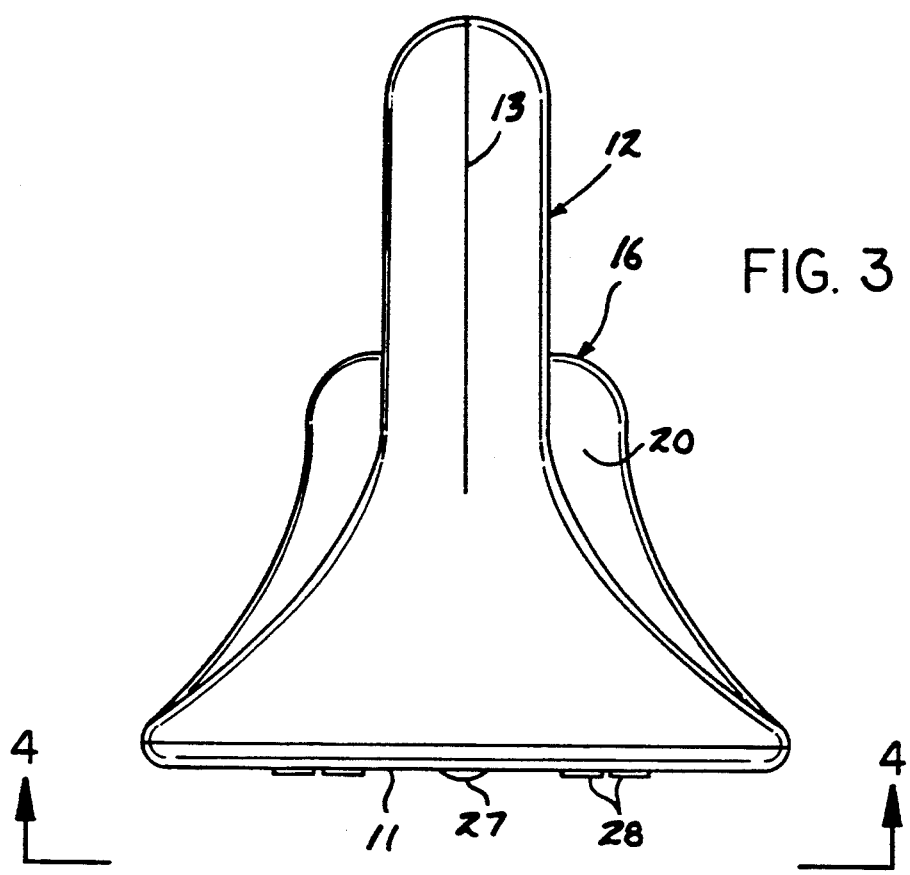
FIG. 3 is an orthographic view, taken along the lines 3—3 of FIG. 2 in the direction indicated by the arrows.
Figure 4:
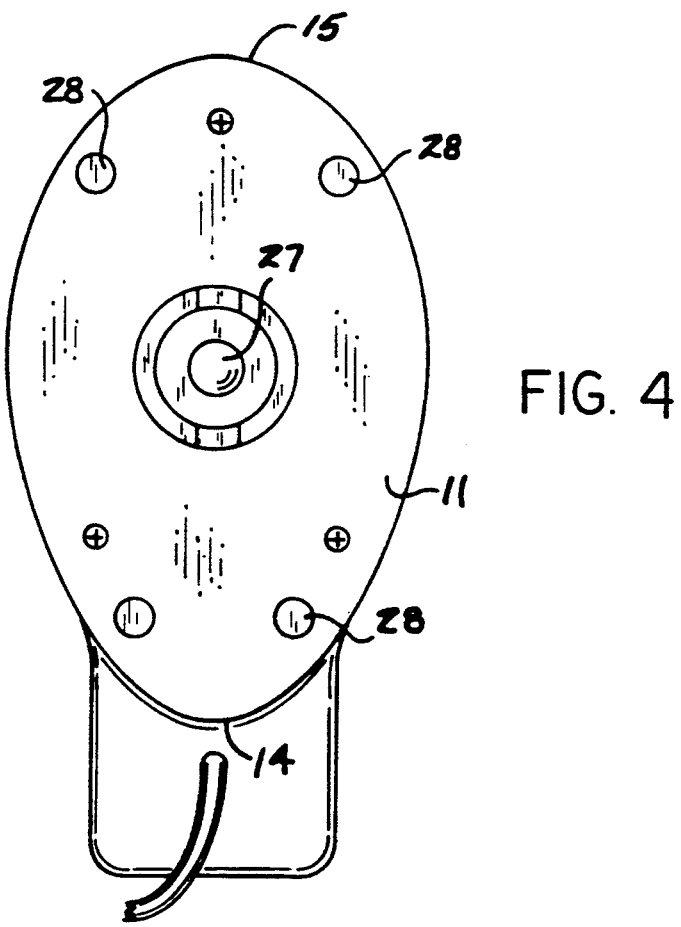
FIG. 4 is an orthographic view, taken along the lines 4—4 of FIG. 3 in the direction indicated by the arrows.

With reference now to the drawings, and in particular to FIGS. 1 to 8 thereof, a new and improved ergonomic computer mouse embodying the principles and concepts of the present invention and generally designated by the reference numeral 10 will be described.

More specifically, the ergonomic computer mouse 10 of the instant invention essentially comprises a planar bottom wall 11, with a housing 12 extending from the bottom wall 11 orthogonally oriented relative thereto. The housing 12 is symmetrically oriented about a peripheral plane 13, wherein it is noted that the housing is of a truncated elliptical configuration, having an elliptical central opening 19 directed therethrough. The central opening includes both major and minor axes 19a and 19b, with the major axis 19a orthogonally oriented relative to the bottom wall 11. The bottom wall is arranged to include a bottom wall arcuate rear end 14 and an arcuate forward end 15 permitting ease of forward and rear motion preventing snagging upon underlying documents. A wrist support leg 16 extends rearwardly of and beyond the bottom wall rear end 14, having the wrist support leg 16 symmetrically oriented about a medial plate 17 that is coplanar with the peripheral plane 13. The wrist support leg 16 includes a concave wrist support surface 20 intersecting a convex housing surface 18 of said housing 12 at an intersection 25. A first activator switch 22 is directed through the housing 12 medially bisected by the peripheral plane 13 spaced from the intersection 25, with a second activator switch 24 mounted from the housing 12 in a facing relationship relative to the opening 19 intersected by the minor axis 19a, with the second activator switch positioned in adjacency to the intersection 25, with the first activator switch 22 spaced above the second activator switch 24.

Electrical supply cord 26 is directed from the housing exteriorly of the concave outer surface 18 and the convex wrist support surface 20.

A motion sensor roller 27 is rotatably mounted medially of the bottom wall 11, with slide pads 28 mounted about the motion sensor roller 27.

Figure 5:
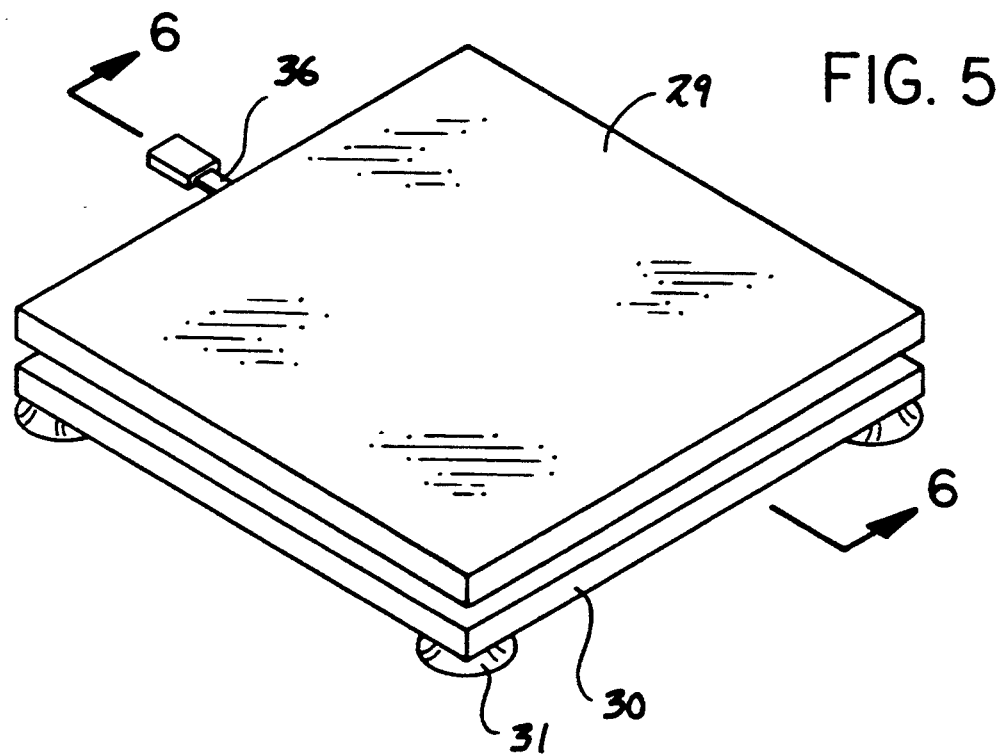
FIG. 5 is an isometric illustration of a mouse support table.
Figure 6:
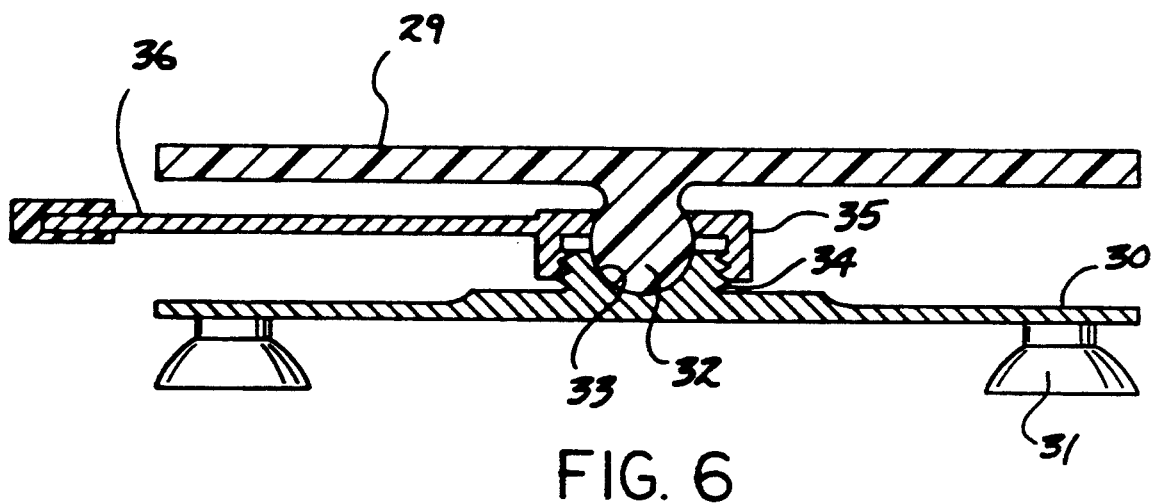
FIG. 6 is an orthographic view, taken along the lines 6—6 of FIG. 5 in the direction indicated by the arrows.

The FIGS. 5 and 6 indicate the use of a mouse support table structure having a mouse support plate 29 pivotally mounted to a base plate 30 to provide for orientation of the mouse during use upon positioning of documents upon the mouse support plate 29, such that support suction cups 31 extend from the base plate 30 for securement to an underlying support surface (not shown). A position sphere head 32 is fixedly mounted medially of the mouse support plate 29 directed into a socket 33 fixedly secured to the base plate 30, with the socket 33 formed about an externally threaded boss 34. An internally threaded cup 35 is mounted threadedly onto the boss 34, with the cup 35 receiving the position sphere head 32 therethrough. A handle plate 36 extends fixedly from the boss 34 to permit ease of rotation and enhanced clamping of the sphere head 32 within the socket 33.

Figure 7:
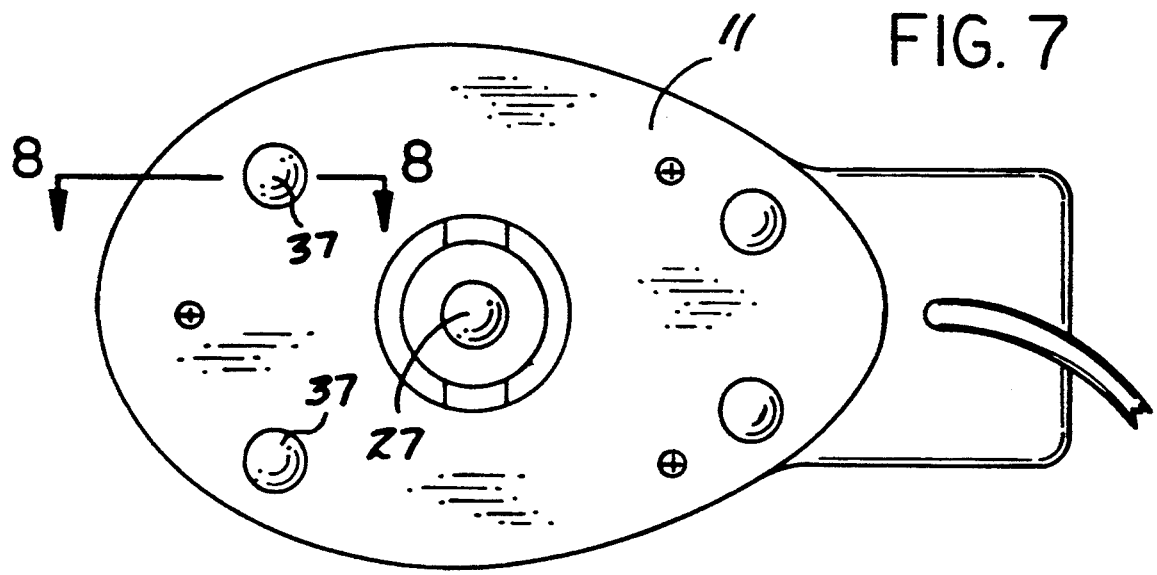
FIG. 7 is an orthographic bottom view of the computer mouse indicating use of roller pads.
Figure 8:
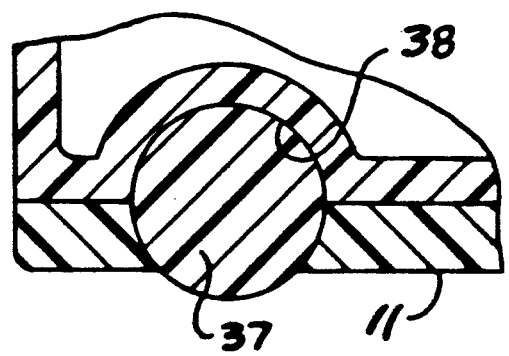
FIG. 8 is an orthographic view, taken along the lines 8—8 of FIG. 7 in the direction indicated by the arrows.

The FIGS. 7 and 8 further indicates the use of the pads 28 replaced by rotary pads 37 of spherical configuration, each received within a respective bottom wall socket 38 in a surrounding relationship relative to the motion sensor roller 27.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ergonomic computer mouse, comprising,
    a bottom wall having a planar bottom wall surface, with a housing extending from said bottom wall orthogonally oriented relative to said bottom wall surface, with said housing having a truncated elliptical configuration symmetrically oriented about a peripheral plane, with the peripheral plane orthogonally oriented relative to said bottom wall surface, and
    a wrist support leg extending from said bottom wall and intersecting the housing at an intersection, with the wrist support leg including a concave wrist support surface, and the housing having a convex outer surface, with a first activator switch directed into the housing in a spaced relationship relative to the intersection and medially bisected by said peripheral plane, and a second activator switch mounted within said housing.

2. A mouse as set forth in claim 1 wherein the housing includes an elliptical central opening, and the second activator switch is arranged in a facing relationship relative to said elliptical central opening, the central opening having a major axis and a minor axis, with the major axis orthogonally oriented relative to said bottom wall surface, and the minor axis intersecting the second activator switch.

3. A mouse as set forth in claim 2 with the bottom wall having a motion sensor roller oriented medially thereof and a plurality of slide members mounted in an array about the motion sensor roller.

4. A mouse as set forth in claim 3 wherein the concave wrist support surface extends laterally beyond opposed sides of the peripheral plane, and the concave wrist support surface is medially intersected by said peripheral plane.

5. A mouse as set forth in claim 4 including a mouse support member, said mouse support member including a mouse support plate, said mouse support plate arranged in a spaced relationship relative to a base plate, the base plate including an externally threaded boss having a socket, with the mouse support plate including a position sphere head received within said socket, and an internally threaded cup threadedly directed about the boss receiving the position sphere head therethrough, with the cup having a handle plate extending beyond the mouse support plate and the base plate, with the handle plate positioned between the mouse support plate and the base plate, whereupon rotation of the handle plate effects constricted movement of the position sphere head within the socket.

* * * * *